Nov. 28, 1961 O. SCHUELLER 3,010,220
MEANS FOR SIMULATING CERTAIN ENVIRONMENTAL
CONDITIONS OF OUTER SPACE
Filed Feb. 2, 1960 2 Sheets-Sheet 2

INVENTOR.
OTTO SCHUELLER
BY
ATTORNEY
AGENT

United States Patent Office 3,010,220
Patented Nov. 28, 1961

3,010,220
MEANS FOR SIMULATING CERTAIN ENVIRONMENTAL CONDITIONS OF OUTER SPACE
Otto Schueller, Dayton, Ohio
Filed Feb. 2, 1960, Ser. No. 6,330
11 Claims. (Cl. 35—12)
(Granted under Title 35, U.S. Code (1952), sec. 266)

The invention described herein may be manufactured and used by or for the United States Government for governmental purposes without payment to me of any royalty thereon.

This invention relates generally to the simulation of anticipated space flight conditions to be encountered outside the earth's atmosphere and, more particularly, to a novel apparatus for simulating the hazards and environmental conditions to be encountered in orbital or space flight.

The successful launching of the first unmanned satellites in orbit around the earth is indicative of the advent of a new era of space flight requiring immediate and rapid research and development towards the next step of launching a manned space vehicle into orbit around the earth which step will naturally be followed by the ultimate step of successful launchings of manned satellites both in orbit around the earth as well as in interplanetary flight. It is seen, therefore, that the pendency of a successful manned space vehicle for travel both in orbit around the earth and to the planets, imposes new and extremely intricate problems of an unusual nature on space scientists and engineers which have not been previously encountered in normal aircraft flights except for rare instances. It is quite evident, therefore, that the solution to these problems depends upon a considerable research and development program primarily concerned with the field of environmental testing for the specific purpose of reproducing and/or simulating as near as possible actual conditions to be encountered in manned space flights. Thus, the development of a number of devices designed for adequately simulating the approximate temperature and pressure conditions found in outer space are necessary, for example, to test the suitability of personal protective clothing and equipment, as for example, sealed cabins, space suits, and oxygen conditioning systems. Furthermore, the effect of these space conditions on the space man must be determined in order that space scientists and engineers may select properly qualified personnel. Moreover, the space scientist and engineer must, himself, be properly and fully qualified to adequately prepare and train the space man for space flight. In order that this latter goal is reached in the most expeditious manner to enable the space scientist and engineer to select the most qualified space personnel for the early period of space travel, considerable knowledge leading to the solution of various physiological and ecological problems and their effect on the survival of the space man outside the earth's atmosphere must be obtained. The latter, therefore, requires a considerable and sustained period of basic research directed towards the development of some means for adequately simulating the effects and conditions prevalent at extreme altitudes above the surface of the earth. Thus, it is highly essential that some simple device or system be developed to determine the reactions of the space man to the various environmental space conditions which will be encountered during space flights. The determination of the effects of space flight on man prior to the time of actual space flight is perhaps the most fundamental factor present in the entire study of space flights.

It is the primary object of the present invention, therefore, to provide a simplified and yet unique device for facilitating basic research in the field of space flight ultimately designed to precondition personnel to substantially all of the environmental conditions of space flight and thus assist in the selection of qualified space pilots and crews and other space flight personnel.

Another object of the present invention resides in a flight simulator device for reproducing and submitting personnel and equipment to the high vacuum conditions encountered in outer space.

It is a further object of the invention to provide a flight simulator which incorporates means for simulating and thus submitting prospective space personnel to solar radiation without the protection normally afforded by the atmosphere.

Another object of the invention provides a novel space chamber incorporating a novel cooling arrangement for submitting the subject being tested to the extreme temperature ranges encountered in outer space.

It is a still further object of the invention to utilize a plurality of interconnecting space chambers formed as a continuous or unitary structure and designed to simulate continuous and entire space flight profiles encountered in outer space during orbital and interplanetary flights.

An additional object of the invention provides a space chamber for simulating and subjecting personnel and equipment to the high vacuum, low temperature and solar radiation conditions to be encountered in space flights.

Other objects and advantages of the invention will become apparent from the following description, taken in connection with the accompanying drawings in which like reference characters refer to like parts in the several figures.

Figure 1:
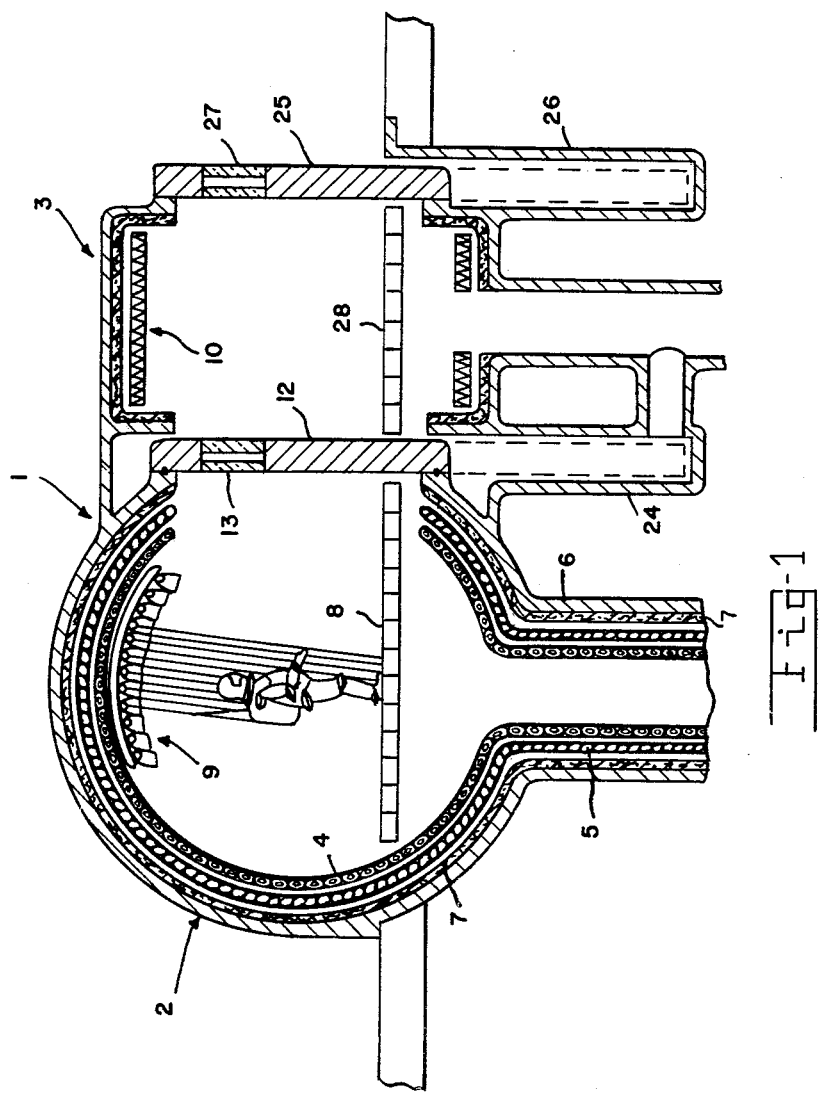
FIG. 1 is a somewhat schematic, partially broken away, cross-sectional view illustrating details of construction of the unitary space chambers of the present invention.

With particular reference to FIG. 1 of the drawings, the space flight simulator of the present invention is indicated generally at 1 as consisting of a vacuum tight space chamber section indicated generally at 2 and a vacuum tight heat or safety chamber section indicated generally at 3. The space chamber section 2 includes an inner shell 4 consisting of a concentric tube system enclosed within a surrounding jacket shaped to conform therewith for a purpose to be described in more detail hereinafter, an intermediate or second shell 5 spaced from said inner shell 4 in concentric relation thereto and consisting of a coil system shaped to conform therewith, likewise for a purpose hereinafter described, and an outer chamber wall 6 covered with a layer of insulation 7.

To provide for proper cooling and to ensure the reduction of temperature within the aforesaid space chamber section 2 to extreme cold ranges, a liquid, as for example, liquid helium, liquid air or liquid oxygen, is circulated through the aforesaid concentric tube system of inner shell 4 and, in addition, a vapor, as for example, helium vapor, is provided within the surrounding jacket thereof. It is noted that liquid helium would be preferred where it is desired to approach a temperature of absolute zero, in which event, inner shell 4 may be maintained, if desired, at between approximately —420° F. and —430° F. due to a combination of the vaporization of the aforesaid liquid helium and the aforesaid surrounding jacket of helium vapor. Moreover, the inner shell 4 is blackened on its inner surface and made reflective on its outer surface, respectively, to absorb a substantial amount of heat radiating from the interior of space chamber section 2 and reflect a substantial amount of heat transferred from the outside thereof.

The previously mentioned coil system of the intermediate or second shell 5 also incorporates a liquid, as for example, liquid nitrogen, liquid air or liquid oxygen maintained at a temperature of approximately —320° F. to act as a reflecting shield against the naturally higher ambient temperatures of the outer chamber wall 6 and thus greatly assist in reducing and maintaining the desired temperature within the interior of said flight simulator. A high degree of vacuum is maintained within both the space chamber and heat or safety chamber sections 2 and 3 by connection thereof to a high vacuum pump system (not shown) which is preferably positioned at a low elevation relative to that of the aforesaid chamber sections. Since the complete high vacuum pump system is unimportant to the present invention, the particular details thereof are not illustrated herein. Thus, it is seen that heat transfer between the inner and intermediate shells and the outer chamber wall is accomplished through means of heat radiation only as is the case for the thermos bottle due to the high vacuum condition thereof.

During operation of the inventive device, the liquid helium and nitrogen and/or liquid air or oxygen are circulated through the previously mentioned concentric tube and coil systems, respectively, of the inner and intermediate shells 4 and 5 by means of re-circulating cryostat systems (not shown) preferably positioned at a lower level as also mentioned above for the high vacuum pump systems. In this manner, the vapors formed from the liquified gases in the aforesaid concentric tube and coil systems by means of the extremely large amounts of heat extracted thereby are re-liquified by means of the re-circulating cryostats and returned in a continuous cycle to the concentric tube and coil systems. These re-circulating cryostats are not shown since the specific details thereof are unimportant to the present invention. Moreover, it is pointed out that, while helium is necessary only to achieve the closest possible approach to absolute zero temperatures, other liquid gases such as liquid air or oxygen are quite adequate where the simulation of radiative heat transfer in outer space is intended. It is also pointed out that the chamber sections 2 and 3 of the present invention may, of course, be utilized either for the testing of the reactions of man or of small animals, if desired, merely by varying the chamber diameter between approximately eight feet for small animals and sixteen feet for man without, obviously, departing from the spirit or scope of the invention.

Again referring to FIG. 1 of the drawings, a platform indicated at 8 is mounted within the aforesaid space chamber section 2 in any desired manner to provide an appropriate support for the man or animal being tested. A device for simulating solar radiation is indicated schematically at 9 as positioned in the said space chamber section 2 in overhead relation relative to the subject being tested. The aforesaid solar radiation simulator 9 may be mounted in any desired manner in space chamber section 2 and may consist of a plurality of high pressure mercury quartz lamps in combination with a plurality of tungsten lamps, filters and reflectors and the like. The aforesaid solar radiation simulator 9 is designed specifically to emit a simulated solar radiation having an intensity of approximately 1,400 watts per square meter on the subject being tested. The latter radiation intensity is equivalent to an illumination of the order of 13,000 foot candles. It is noted that the aforesaid radiation intensity of 1,400 watts per square meter is equivalent to approximately 50% greater intensity than the solar energy normally falling at ground level on an average summer day with the sun directly overhead.

The previously mentioned heat or safety chamber section 3 is formed integral with the space chamber section 2 to form the unitary flight simulator, as hereinbefore stated. Between the space chamber and heat and safety chamber sections 2, 3 is a doorway closed by a door 12 to provide communication therebetween when desired and ensure greater flexibility during actual test operations. In this manner, the reactions of the subject being tested, whether man or animal, to the sudden shock of rapid changes in simulated environmental space conditions through means of the rapid transfer between the aforesaid chamber sections 2, 3 may be facilitated. For example, the man or animal being tested may first be positioned on the platform 28 within the aforesaid heat or safety chamber section 3 which may be utilized as an intermediate chamber and equipped with a heating element indicated schematically at 10 for maintaining high temperatures therein to simulate the temperatures occurring from aerodynamic heating resulting from the ascent and re-entry phases of space flight wherein maximum skin temperatures up to 2000° F. may be expected for a few minutes. Thus, as where a boost glide vehicle is utilized, a temperature variance from a low of —65° F. to a high of approximately +932° F. within approximately a two minute interval may be effected by moving the equipment or subject in protective clothing being tested in rapid manner between the cooled space chamber section 2 and the heated heat or safety chamber section 3 to thus simulate the sudden shock occurring during the aforesaid aerodynamic heating phase of the space flight. To facilitate the aforesaid movement or transfer of the equipment or subject being tested, the previously mentioned door 12, which seals off the space chamber section 2 from the heat or safety chamber section 3, may be slidably mounted and movable into its open position indicated in dotted lines within the door well 24 illustrated in FIG. 1 of the drawings. It is also seen that the heat or safety chamber section 3 may likewise be closed off by means of a similar door 25 slidably mounted and movable into its open position indicated in dotted lines within a similar door well 26. Each of said doors 12 and 25 is equipped with a double glass observation port indicated at 13 and 27, respectively, to facilitate observation of the reactions of the subject being tested within either chamber section 2, 3.

Thus, it is seen that the subject or equipment to be tested may be initially positioned within the heat or safety chamber section 3 on the platform 28 as seen in FIG. 1, for example, and subjected to a gradually increasing intensity of heat through use of the heating element 10 until a predetermined maximum temperature has been obtained, at which point, the subject or equipment may be then submitted to the sudden shock of a large drop in temperature by being rapidly transferred to the platform 8 within the space chamber section 2 which has been cooled to an extremely cold temperature range; after being submitted to a rapid change in temperature from high to low, the subject or equipment may then be returned from the extremely cold space chamber section 2 to the extremely hot heat or safety chamber section 3. Naturally, the effect of these rapid changes in temperatures are continually studied and recorded. Further, the subject or equipment being tested may remain in the aforesaid space chamber section 2 and be subjected to simulated solar radiation through use of the solar radiation simulator 9 in the manner previously specified which may be swivelly mounted in any manner desired and alternately turned on and off to again give a considerable shock effect.

Figure 2:
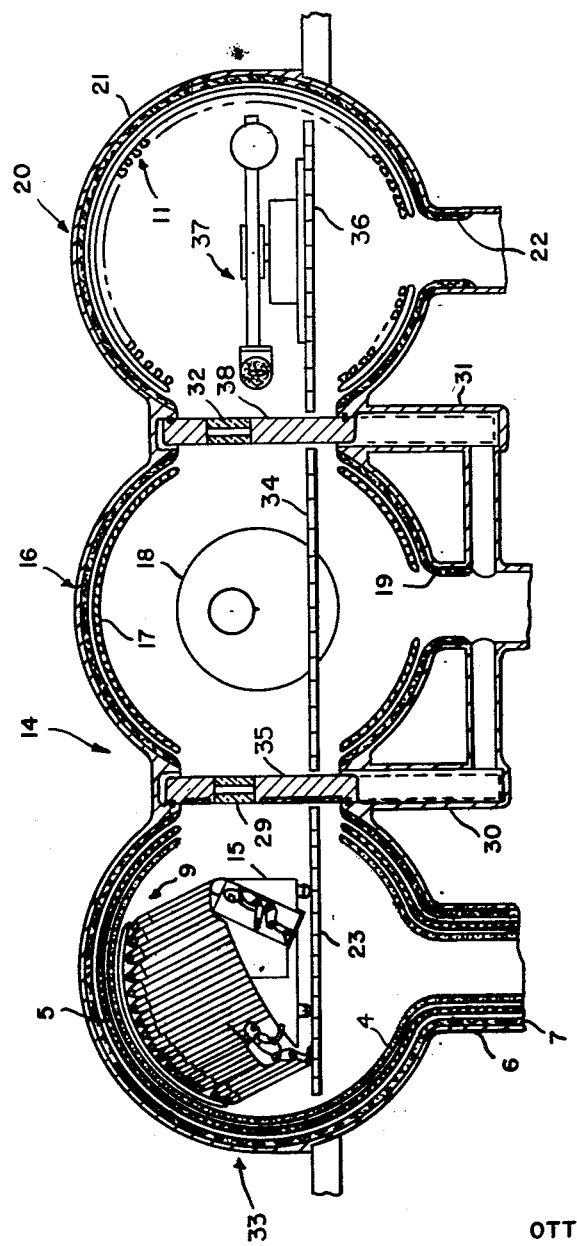
FIG. 2 is a second somewhat schematic, partially broken away, cross-sectional view similar to that of FIG. 1 but illustrating a more complete arrangement of the present invention in which entire flight profiles are simulated.

With specific reference to FIG. 2 of the drawings, a much larger facility designed to test complete nose cones and to simulate entire environmental space conditions is illustrated generally at 14 as including a space chamber section 33 similar in construction to the already described space chamber section 2 of FIG. 1 of the drawings. However, within the interior of the space chamber section 33 of FIG. 2 is positioned a test vehicle indicated at 15 which test vehicle is positioned on a platform indicated at 23 as mounted within the chamber section 33 and is spacious enough to accommodate a passenger compartment in which is positioned, as clearly shown, the subject to be tested in a space suit. In addition, the interior of the aforesaid space chamber section 33 is made large enough to accommodate a second subject also shown in a space suit for the purpose of testing the capability and facility with which both may perform certain simple operations while confined in a space suit and undergoing the previously described simulated environmental conditions as well as being submitted to various other environmental conditions of outer space flight.

In addition to the aforesaid space chamber section 33, the enlarged test facility of FIG. 2 also includes, as one example, a start and safety chamber section 16 and a heat chamber section 20, all formed as an integral unit therewith. This use of the three chamber sections 33, 16 and 20 is, of course, illustrative of one example only and is not to be construed as any intention to limit the invention thereto. Obviously, other arrangements may be had without departing from the spirit or scope of the invention. Within the aforesaid start and safety chamber section 16 is positioned a concentrically arranged liquid nitrogen shield indicated at 17 which liquid nitrogen shield 17 consists of a coil system similar to that of the intermediate or second shell 5 of the reduced facility of FIG. 1 of the drawings. Further, the aforesaid start and safety chamber section 16 incorporates a main entrance door 18 and a platform 34. A layer of insulation indicated at 19 is formed on the inner wall surface of said chamber section 16 outwardly of and spaced from said liquid nitrogen shield 17.

A door indicated at 35 having a double glass observa-port 29 is utilized for closing off chamber section 33 from chamber section 16 and is slidable into door well 30 for facilitating quick transfer therebetween. The previously mentioned heat chamber section 20 also includes an outer wall surface 21 having a layer of insulation 22 incorporated on the inner wall surfaces thereof and a plurality of special heat lamps indicated generally at 11 to simulate the extreme temperature conditions to be encountered in outer space. Said special heat lamps 11 are shown as being schematically positioned in surrounding relation within said heat chamber section 20, since the specific nature thereof is unimportant to the present invention. Furthermore, heat chamber section 20 incorporates a platform 36 positioned therein in any desired manner for the purpose of supporting a centrifuge device indicated generally at 37 and described in detail in my copending patent application Serial No. 6,329, filed February 2, 1960.

Furthermore, another door indicated at 38 as slidably movable between a closed position and an open position in door well 31 also incorporates a double glass observation port 32 and is provided to facilitate rapid transfer between and seal off chamber section 16 from chamber section 20 when desired. Moreover, each of said chamber sections 33, 16 and 20 is adapted for connection to a suitable high vacuum pump system preferably positioned at a lower level as in the case of the reduced facility of FIG. 1 of the drawings. The aforesaid high vacuum pump system is not shown since the details thereof are unimportant to the present invention. Additionally, a re-circulating cryostat system may also be utilized therewith for the same purpose previously described, but is likewise not shown since it also forms no part of the present invention.

The previously described start and safety chamber section 16 may also be equipped with vibration and noise simulators and, if desired, heat chamber section 20 may also incorporate a g-load simulator to thus effect the simulation of entire flight profiles in a continuous cycle beginning with vibration and noise environment in safety chamber section 16 combined with high g-loads, heating stress and vacuum conditions in heat chamber section 20 and, finally, extreme temperature shocks through rapid movement back-and-forth between chamber sections 33 and 16.

Thus, the present invention provides a unique and yet simple system for studying the reactions of man while in a space suit, for example, and submitted to the extreme environmental conditions to be encountered in space flight. The space chamber facility of the subject invention provides a novel means for adequately simulating the environmental conditions of outer space, as for example, the approximately 50% more solar radiation encountered at extreme altitudes on one side and, at the same time, the cold black sky of approximately $-454°$ F. on the other side. Moreover, when a satellite is in orbit, approximately every 40–60 minutes, it is in the shadow of the earth almost entirely surrounded by the aforesaid cold black sky of $-454°$ F. in addition to being subjected to an extremely high vacuum. With the latter space environmental conditions being successfully simulated by the present invention, the ability of a space man equipped with a space suit to perform normal manual functions such as would be necessary in the assembly of a space platform, for example, may be tested and recorded. The enlarged facility of FIG. 2 of the drawings is ideally suited for such tests which are of the utmost importance since it is impossible to calculate or even estimate the effect of such environmental outer space conditions on a man in a pressurized space suit. Nor is it possible to predict the facility with which the space man may assemble a space platform while being subjected to the previously described extreme conditions of high vacuum, alternately low and high temperatures and without any support because of the absence of the directional force of gravity while in a stiff pressurized suit. While certain mechanical stresses in the pressurized suit can be and have been calculated, as for example, the elongation force effected in the suit shell at the waist when the suit is inflated with 5 lbs./sq. in. is approximately 1000 lbs. whereas, when the inflation pressure is the normal atmospheric pressure of 14.7 p.s.i. the elongation force is 3000 lbs. and the lateral tension in the material of the space suit is twice that of the longitudinal tension, the mobility requirements cannot be calculated. In connection with the latter, it is pointed out that the dimensions of the human body vary considerably with changes to different positions. For instance, the outside of the arm elongates about 9 centimeters and the inside of the arm contracts about 12 centimeters when the outstretched arm is bent. With an ordinary suit, the open sleeves thereof can easily compensate for the above-described changes in dimensions; however, a pressured suit expands as a balloon and becomes very stiff. Other problems involving the physiological requirements of man for oxygen and removal of carbon dioxide, water and odors further complicate the problem which cannot be accurately predicted except through utilization of the inventive flight simulator to test and record the reactions of the space man to the previously described environmental conditions of outer space. Thus, most, if not all, of the various problems of outer space relative to the effect of environmental conditions on the comfort and movement of man may be solved by the inventive flight simulator device.

Thus, there has been developed by the present invention a combined space facility simulating the three major environmental conditions of outer space, namely, high vacuum, low temperature and high solar radiation. In regard to the condition of high vacuum, it has been determined that the static atmospheric pressures encountered by orbiting satellites are in the range of approximately $10^{-7}$ mm. of mercury to $10^{-10}$ mm. of mercury for variations in altitude of from 100 to 1,000 kilometers. On the other hand, the dynamic pressures experienced by fast orbiting vehicles has been determined to be approximately three orders of magnitude higher, i.e., approximately $10^{-4}$ mm. of mercury to $10^{-7}$ mm. of mercury with variations in altitude from 100 to 1,000 kilometers. It is to be emphasized, however, that the atmospheric pressures encountered at greater altitudes is considered as practically zero. However, in connection with the testing of personal equipment, a vacuum of from $10^{-4}$ mm. of mercury to $10^{-5}$ mm. of mercury only is considered necessary in order to prevent heat transfer by either conduction and/or convection. Moreover, mechanical stresses to which a pressurized suit may be subjected are believed to be practically the same whether the surrounding vacuum is $10^{-4}$ or $10^{-9}$ mm. of mercury. In regard to the latter, there are presently available high vacuum pumps designed to create a vacuum approximately $10^{-5}$ mm. to $10^{-6}$ mm. of mercury and, therefore, the simulation of the approximate conditions of high vacuum found in outer space may be quite satisfactorily effected with the present arrangement.

The second major environmental condition found in outer space, namely, that of extremely low temperatures may likewise be satisfactorily simulated with the present device. In connection with the latter, it has been determined that the mean temperatures of outer space varies between approximately 3° K. (equal to −270° C. or −454° F.) when the stars are included to approximately 0° K. (equal to −273° C. or −460° F.) with the stars excluded. It is seen, therefore, that the space chamber section 2, as for example, that viewed in FIG. 1 of the drawings, of the present invention simulates these extremely low temperatures of outer space to a high degree through blackening one surface of the intermediate or second shell 5 as hereinbefore described and through the vaporization of liquid helium, for example, in either the coil or concentric tube system as hereinbefore described. In connection with the latter, it is noted that the boiling point of liquid helium at standard pressures is 4.2° K. (equal to −269° C. or −452° F.) and, although the latent heat of vaporization of helium is quite low (5.5 calories per gram), the required cooling effect may be obtained through the utilization of the relatively high specific heat of helium vapor (1.29 calories per gram) for precooling in the aforesaid concentric tube or coil system as described hereinbefore with reference to the inventive device. Furthermore, insulation of the appropriate chamber section is improved through the use of a liquid nitrogen shield, as hereinbefore described with particular reference to FIG. 2 of the drawings. The boiling point of liquid nitrogen is 77.3° K. (equal to −196° C. or −320° F.). On the other hand, chamber temperatures of approximately 20° K. to 30° K. (equal to approximately −250° C. or −420° F.) is considered adequate for simulation of outer space conditions. It is noted that, although liquid hydrogen might be used, its boiling point is 20.4° K. (equal to −252.6° C. or −422° F.) and, accordingly, the danger of explosion in the presence of pure oxygen for air conditioning purposes would be extreme. The third major environmental condition found in outer space and involved in the present invention resides in the solar radiation encountered at extreme altitudes. The intensity of this solar radiation is measured by a quantity known as the solar constant which is defined as the total radiation energy falling perpendicularly on a unit area in the upper atmosphere at the mean distance between the sun and the earth of 149.68 millions km. Its value is estimated at about 7.38 B.t.u./sq. ft./minute or equal to 1,400 watts per square meter as previously stated. This latter value of 1,400 watts per square meter is approximately 50% higher than the solar energy falling on the ground on an average summer day with the sun directly overhead. This third major environmental condition of outer space, namely, that of the increased intensity solar radiation is adequately simulated or effected by means of the previously described combination of high pressure quartz lamps, tungsten lamps, filters and reflectors, indicated in general at 9 in FIG. 1 of the drawings. The aforesaid quartz and tungsten lamps adequately simulate an energy spectrum of the sun consisting of approximately 51% infrared having a wave length of from 7,000 to 100,000 A., 41% visible light having a wave length of from 3,800 to 7,000 A., and 7.5% ultraviolet having a wave length from 2,000 to 3,800 A. Moreover, the short wave ultraviolet region of the energy spectrum of the sun which is that having a wave length of from 100 to 2,000 A. may likewise be simulated, if desired, through the use of a high voltage, low pressure spark discharge and, in addition, the X-ray region of the spectrum which is that region of from 100 to 1 A. may also be simulated through the use of a low voltage X-ray source. While the present invention deals primarily with the study of the effect of the three major environmental conditions of low pressure, high and low temperatures and high intensity solar radiation, other factors found in the natural environment of outer space may also be considered. Some of these factors are cosmic rays, meteoric bombardment or auroral X-rays and electrons, ozone, and disassociated (atomic) gases. In connection with these other factors, attention is called to the consideration that both cosmic rays and meteoric bombardment are generally overrated as hazards. For example, cosmic rays primarily consist of a flux or stream of electrically charged atomic nuclei at various energy levels ranging up to $10^{17}$ or $10^{18}$ ev. (equal to one half of a foot pound per particle). These particles crash into the atmosphere with energies millions or even billions of times greater than those that can be reproduced in a laboratory. The specific study of the effect of cosmic radiation, however, is not a part of the present invention but, nevertheless, the present conclusion is that hazards therefrom are not serious at altitudes immediately beyond the atmosphere but at greater altitudes and with increasing flight durations, the dosage received from cosmic radiation may exceed the level of tolerance. In regard to meteoric bombardment, the hazard therefrom is extremely small since the probability of meteoric particles actually striking a satellite is extremely low especially when their orbit is set to deliberately avoid the orbits of known comets and meteoric showers. For example, a collision with a meteorite of visual magnitude zero (i.e., a mass of 0.268 gram and 4 mm. in diameter) has been estimated to occur on the average of once in approximately every 250,000 years on an area of 1,000 square feet and, in addition, with a meteorite of visual magnitude equal to six (i.e., a mass of about 1 mg. and 0.6 mm. in diameter) has been estimated to occur about once in every 20 years.

Cosmic dust will, however, produce a gradual erosion of the metallic skin of the satellite in the manner quite similar to sand blast or sputtering and this condition, of course, can be easily simulated, if desired. The other environmental conditions stated above, namely, that of auroral X-rays and electrons, zone and ionized gases are only of minor significance and are, therefore, not discussed in connection with the present invention.

The flight simulator device 1 of the present invention, therefore, successfully simulates all of the major environmental conditions to which the object or subject being tested would be submitted to while engaged in orbit, either as a satellite or on a space platform, or in interplanetary travel. Obviously, the space chamber system of the present invention may be easily varied in size or shape as desired in order to accommodate the testing of either a human or an animal or of various types of equipment, as for example, closed respiratory systems, waste disposal and ecological systems, regulators and/or space suits, capsules, recirculating oxygen systems and other component parts without departing from the spirit or scope of the invention.

I claim:

1. A space chamber system for simulating environmental conditions of outer space including an evacuated space chamber section and an evacuated heat chamber section integrally formed and in communication with each other, said space chamber section comprising outer chamber walls, an inner liquid gas evaporator concentrically arranged in spaced relation relative to said outer chamber walls enclosing an inner test chamber and incorporating a plurality of gas filled concentric tubes arranged in concentric relation thereto and enclosed within a vapor gas filled jacket and an intermediate liquid gas concentric shield arranged in spaced relation between said inner gas evaporator and said outer chamber walls and incorporating a concentrically arranged coil system incorporating liquid gas maintained at a temperature of approximately −320° F., and said outer walls to assist in preventing transfer of heat relative to said inner test chamber, and a means for simulating solar radiation at extreme altitudes positioned within said space chamber section interiorly of said evaporator, said solar radiation means comprising a combination of a plurality of high pressure mercury quartz lamps, tungsten lamps, filters and reflectors adapted to simulate the entire spectrum of solar radiation.

2. A space chamber system for the simulation of environmental conditions of outer space comprising an evacuated space chamber section in combination with an evacuated heat chamber section, said space chamber section comprising insulated outer chamber walls, an inner evaporator system for changing gas in the liquid state to vapor including a plurality of liquid gas-filled tubes and a vapor gas filled jacket surrounding said plurality of tubes in spaced concentric relation to said walls and enclosing an inner test chamber, an intermediate liquid gas shield positioned in spaced concentric relation between said gas evaporator and said outer chamber walls and incorporating a coil system of liquid gas and a jacket of vapor gas enclosing said coil system and shielding said inner evaporator system from heat transfer from said outer chamber walls, and means simulating solar radiation positioned within said space chamber system interiorly of said evaporator system comprising a plurality of high pressure mercury quartz lamps in combination with a plurality of tungsten lamps, filters and reflectors to reproduce the desired solar radiation within said space chamber section.

3. A space simulator for reproducing the environmental conditions of outer space comprising an evacuated first compartment housing a space chamber, an evacuated second compartment integrally formed and in communication with said first compartment and housing a start and safety chamber, and an evacuated third compartment integrally formed with and in communication with said second compartment and housing a heat chamber, said first compartment incorporating an inner circulating liquid gas evaporator positioned within the space chamber and enclosed within a jacket of gas vapor and a liquid gas reflecting shield positioned in spaced relation to and outwardly of said liquid gas evaporator, said second compartment incorporating an entrance door and a coil system concentrically disposed within the start and safety chamber and consisting of a liquid gas shield positioned in spaced relation to the inner wall surface of said second compartment and said third compartment including heat means to simulate the extreme temperature conditions encountered in outer space, and slidably mounted closure means positioned between said first and second compartments and said second and third compartments facilitating rapid transfer therebetween.

4. A space simulator for reproducing environmental conditions of outer space and simulating entire flight profiles comprising a space chamber system including a main, outer spherical wall section, a liquid gas evaporator consisting of a concentric tube system surrounded by a jacket of gas vapor for cooling said evaporator on vaporization of said gas to temperatures below a predetermined temperature positioned in spaced relation to said outer wall section and enclosing an inner test chamber and a liquid gas shield maintained at a predetermined low temperature positioned in concentric spaced relation between said gas evaporator and the inner walls of said outer wall section substantially preventing heat transfer therebetween, a heat chamber incorporating a plurality of circumferentially disposed heat lamps therein, and a safety chamber positioned within said space simulator between and in communication with said space chamber and said heat chamber, said space chamber including an inner shell consisting of a plurality of concentric tubes enclosing circulating coolant and enclosed in a jacket of vapor coolant.

5. A space simulator for reproducing environmental conditons of outer space as in claim 4, said space chamber including a horizontally disposed platform positioned therein for receiving a vehicle thereon adapted to receive a man in a space suit and sun simulator means incorporated within said space chamber for exposing said vehicle and the space man therein to solar radiation.

6. A space simulator for reproducing environmental conditions of outer space as in claim 4, said space chamber incorporating a combination of high pressure mercury quartz lamps with special tungsten lamps, filters and reflectors effecting simulation of natural solar radiation with a predetermined energy of 1400 watts/sq. meter equal to an illumination of 13,000 ft. candles.

7. A space simulator for reproducing environmental conditions of outer space as in claim 4, and a sun simulator positioned in circumferential relation within said space chamber.

8. A space simulator for reproducing environmental conditions of outer space as in claim 4, and a pair of doors mounted between said safety chamber and said space and heat chambers and movable between a raised, closed position and a lower, open position to facilitate rapid transfer therebetween and thus simulate the temperature shocks normally encountered in outer space.

9. A space simulator for reproducing environmental conditions of outer space as in claim 4, said space chamber being under a high vacuum of between $10^{-4}$ and $10^{-5}$ mm. of Hg to substantially simulate the pressures of outer space and thereby substantially eliminating heat transfer by conduction and convection between the chamber walls.

10. A space simulator for reproducing environmental conditions of outer space as in claim 4, said liquid gas evaporator consisting of an inner hollow-walled shell including a concentric hollow tube system filled with circulating liquid helium and surrounded by a jacket of helium vapor to cool said inner shell to more than −400° F by vaporization of the liquid helium and the helium vapor.

11. A space simulator for reproducing environmental conditions of outer space comprising a main space chamber having vacuum-tight walls incorporated therein, a safety chamber adjacent to and in communication with said space chamber, and a heat chamber adjacent to and in communication with said safety chamber remote from said space chamber, said space chamber having outer chamber walls, an inner concentrically arranged liquid gas evaporator enclosing an inner test chamber and comprising an inner concentric tube system positioned in spaced relation to said outer walls and enclosing a liquid gas cooled to a predetermined low temperature and having means surrounding said tube concentric system with concentrically arranged vapor gas and an intermediate heat reflecting coil system positioned in concentric spaced relation between the outer walls of said main space chamber and said liquid gas evaporator and acting as a radiation shield substantially assisting in preventing heat transfer from the naturally higher ambient temperatures of the vacuum-tight walls of said main space chamber relative to said inner test chamber.

References Cited in the file of this patent

UNITED STATES PATENTS

| | | |
|---|---|---|
| 1,827,530 | Le Grand | Oct. 13, 1931 |
| 2,244,082 | Reyniers | June 3, 1941 |
| 2,516,419 | Reyniers | July 25, 1950 |
| 2,939,316 | Beecher et al. | June 7, 1960 |